United States Patent [19]
Merrell et al.

[11] 3,877,486
[45] Apr. 15, 1975

[54] ELECTRICAL-TO-FLUIDIC INTERFACE DEVICE

[75] Inventors: Jimmy D. Merrell, Madison; Samuel J. Spurgeon, Jr., Huntsville; J. C. Dunaway, Falkville, all of Ala.

[73] Assignee: The United States of America as represented by the Secretary of the Army, Washington, D.C.

[22] Filed: Oct. 1, 1973

[21] Appl. No.: 402,546

[52] U.S. Cl. .............................. 137/831; 335/277
[51] Int. Cl. ........................................... F15c 1/04
[58] Field of Search ........ 137/832, 831, 625.64, 83; 251/137, 138; 335/271, 274, 277

[56] References Cited
UNITED STATES PATENTS

| | | | |
|---|---|---|---|
| 1,684,603 | 9/1928 | Stephenson................... | 251/137 X |
| 1,742,285 | 1/1930 | Shannon........................ | 251/137 X |
| 3,055,346 | 9/1962 | Hardesty et al............ | 137/625.64 X |
| 3,209,365 | 9/1965 | Fasola, Jr..................... | 335/277 X |
| 3,266,513 | 8/1966 | Voit, Jr......................... | 137/831 |
| 3,289,687 | 12/1966 | Dunaway...................... | 137/831 |
| 3,589,672 | 6/1961 | Hoolloman ................... | 251/137 X |
| 3,678,951 | 7/1972 | Coakley........................ | 137/83 X |
| R27,712 | 7/1973 | Becker et al................. | 137/832 X |

*Primary Examiner*—William R. Cline
*Attorney, Agent, or Firm*—Robert P. Gibson; Nathan Edelberg; Jack W. Voigt

[57] ABSTRACT

An electrical-to-fluidic interface device is disclosed for converting an electrical error signal into a fluidic control force for missile guidance. A poppet valve is electrically activated and pressure aided during operation to rapidly switch the control force in response to the electrical error signal input.

2 Claims, 4 Drawing Figures

ELECTRICAL-TO-FLUIDIC INTERFACE DEVICE

SUMMARY OF THE INVENTION

A fluidic interface device responds to electrical error signal inputs to control fluid flow to output ports. The electrical signal switches a stepped or digital fluid flow output between output ports for controlling functions such as direction of missile flight. The switching action is pressure aided to accomplish switching rapidly, on the order of at least 200 times per second. Compressed bumper stops and the natural vacuum of the fluidic device control ports provide the pressure aiding when the electrical input signal activates means for switching the poppet valve into the control passages of the fluidic device. Switching of the poppet valve causes the fluid flow to change from one output port to another.

DESCRIPTION OF THE PREFERRED EMBODIMENT

Figure 1:
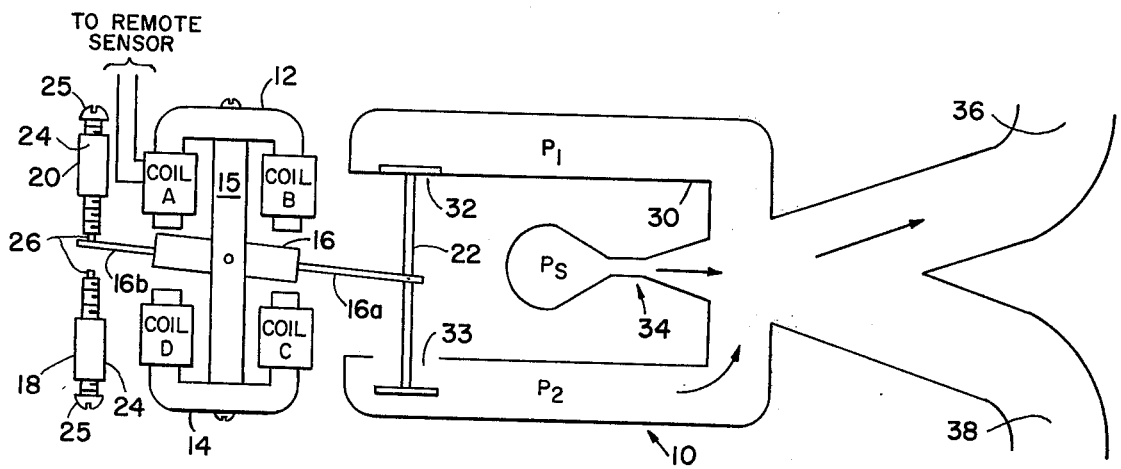
FIG. 1 is a diagrammatic illustration of one embodiment of the interface device according to the principles of the present invention.
Figure 2:
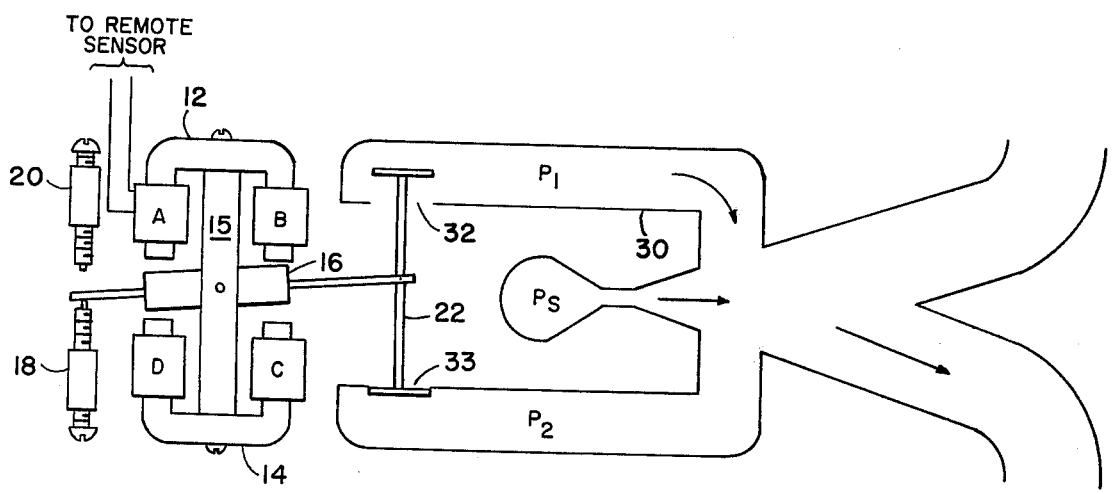
FIG. 2 is a further diagrammatic illustration of the embodiment of FIG. 1, indicating the change of the output in response to a change in the input signal to the device.
Figure 3:
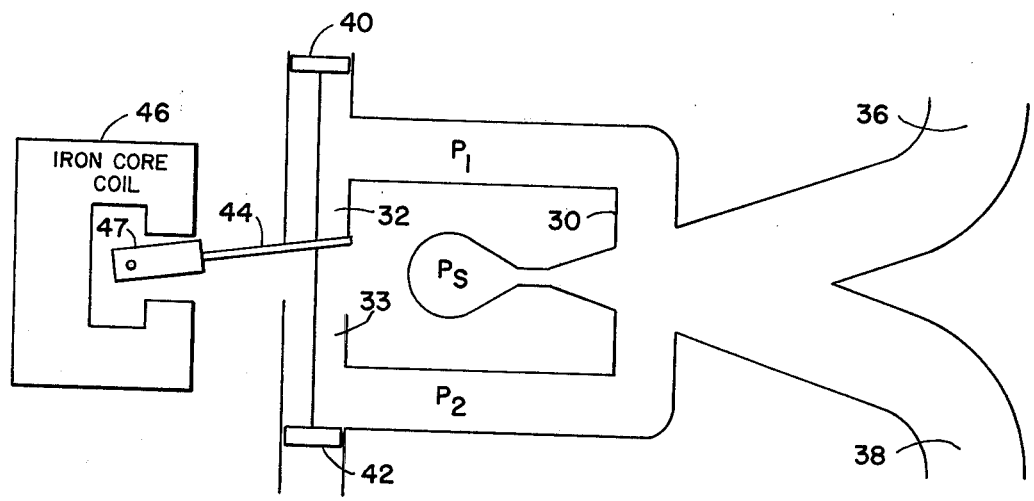
FIG. 3 is a diagrammatic illustration of a second embodiment of the interface device according to the principles of the invention.
Figure 4:
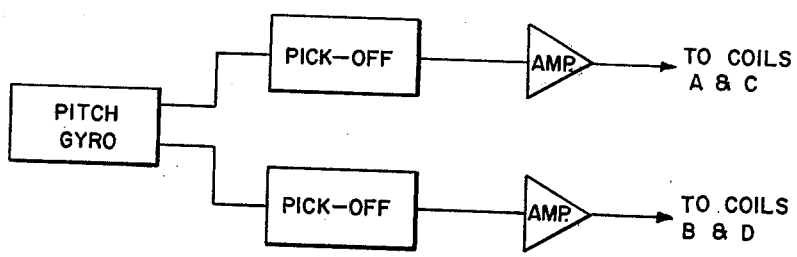
FIG. 4 is a simplified diagram of related system components providing inputs to the interface device.

Referring now to the drawings, FIGS. 1–3 illustrate two electrical-to-fluidic interface devices wherein like parts have like numbers throughout the several views. As shown in FIG. 1, interface device 10 comprises four coils (A, B, C and D), iron cores 12 and 14 for supporting the coils, an armature assembly 16, bumper stops 18 and 20, a poppet valve 22, and a fluidic amplifier 30. Fluidic amplifier 30 includes a source of constant supply pressure Ps which flows out through a power jet 34 and into the main body of the amplifier. When control port 32 is closed and port 33 is opened, incoming ambient air pressure through port 33 causes the supply jet to be deflected and flow out of output port 36. When control port 33 is closed and port 32 is open, the supply jet is deflected and flows out through an output port 38 (as shown in FIG. 2). Iron cores 12 and 14 are U-shaped and disposed with the ends facing each other. Coils A and B are supported on the ends of core 12 and coils C and D are supported on the ends of core 14. A support member 15 maintains a position of the coils in a plane and maintains separation of the ends of iron cores 12 and 14 a fixed distance apart. Armature assembly 16 is moveably supported by support member 15 and disposed between the ends of iron cores 12 and 14 for rotational movement in the plane of the cores. Arm 16a of the armature moveably supports poppet valve 22 on the end thereof for opening and closing respective control ports 32 and 33 of fluidic amplifier 30. The opposing arm 16b of armature 16 projects between two bumper stops 18 and 20 disposed in the plane of armature rotation. These stops are positioned to assure alternate closing of control ports 32 and 33 while simultaneously allowing pressure to be developed against a resilient pad on the respective bumper stops. Thus stops 18 and 20 each comprise a supporting mount 24, an adjusting screw 25 and a resilient rubber pad 26 positioned to stop rotation of armature 16 when the poppet valve has closed either control port 32 or 33. The electrical circuits for activating coils A, B, C and D are not shown in detail but are indicated simply by the two electrical wires represented as going between coil A and a remote sensor. Typically, in providing missile guidance one or more of the interface devices are used in maintaining direction of missile flight. As shown in FIG. 4 a pitch gyro is disposed for sensing changes in missile pitch direction. Electronic pick-offs associated with the gyro sense changes in pitch and provide electrical pulse-duration modulation (PDM) output signals which may be coupled through respective amplifiers to coils A and C and coils B and D for activating the fluidic jet reaction valve 30. Obviously various types of sensor signal inputs and combinations thereof may be coupled to the interface device for activating the PDM response of the fluidic amplifier.

Operation of the preferred embodiment of the invention may be seen readily in FIGS. 1 and 2. In FIG. 1, with coils A and C energized by an electrical input signal and coils B and D unenergized, the magnetic forces generated by coils A and C cause armature assembly 16 to be disposed with arm 16b pressed against bumper stop 20. This closes port 32 and opens port 33 causing the supply jet to flow out of port 36 of the amplifier. The rubber pad on bumper stop 20 is compressed to a maximum due to the magnetic force exerted on the armature 16. While port 32 is closed, a partial vacuum is formed within chamber P1 of port 32. When coils A and C are de-energized, the partial vacuum in chamber P1 begins to reverse the direction of poppet valve 22 and thus enhances opening of port 32 and closing of port 33. As the coil holding force is released the compressed bumper pad on stop 20 restores itself and forces the armature 16 toward bumper stop 18, aiding the closing of port 33. Within a predetermined time interval after coils A and C are de-energized, coils B and D are energized with an electrical voltage and armature 16 is drawn to coils B and D as noted in FIG. 2. Arm 16b compresses the bumper pad on bumper stop 18 and closes port 33 while simultaneously opening port 32, thereby causing the supply jet to flow through output port 38. When coils B and D are de-energized the partial vacuum which has now been created in control chamber P2, begins to reverse the direction of force on poppet valve 22 and begins reclosure of control port 32. The compressed bumper pad on stop 18 forces the armature 16 toward bumper stop 20 aiding the reclosing of port 32. Within a pre-determined time interval after coils B and D are de-energized, coils A and C are again energized with an electrical voltage and the armature 16 is drawn to coils A and C, repeating the cycle.

The combined forces of the compressed bumper pad and the partial vacuum in the closed control port chamber aid in reversing the direction of force on the poppet valve and armature assembly during each half cycle of operation, which enhances the switching of the fluidic amplifier at the rate of 200 times or more per second. Thus, within $4 \times 10^{-3}$ seconds a complete cycle of operation occurs. Thus, an alternating output from the fluid amplifier output ports provides a bang-bang type of guidance system for maintaining the missile pitch control.

FIG. 3 discloses a pressure aiding interfacing device wherein the control ports 32 and 33 of fluidic amplifier 30 receive pressure aid from systems 40 and 42 attached to a flapper valve 44. In this simple interface device a iron core coil 46 is disposed to alter a magnetic flux distribution in the desired manner to control the direction of rotational movement of armature 47 between the poles thereof. Flapper 44 is fixed to armature 47 and extends over the opening of control port 32 or control port 33, depending on the relative position of the flapper. As shown, with the flapper closing port 32 a reversal of the voltage across coil 46 initiates movement of the flapper 44 toward opening 33. The partial vacuum within control chamber P1 initiates motion of piston 40 toward the chamber when the electromagnetic holding force is removed from the coil prior to reversal of polarity thereacross, thereby initiating movement of flapper 44 toward control port 33 substantially prior to the reversal of polarity across the coil. The flapper valve of FIG. 3 can also be operated without the pistons, chambers P1 and P2 being sealed where the pistons are seated.

The electrical-to-fluidic interface device allows fluidic jet reaction valve switching at a rate in excess of 200 hertz. The poppet valve located within the control port and pressure aided by the vacuum within a particular port and the rubber stop pressure allows this rapid PDM output to be obtained without the need of separate piston elements.

Although a particular embodiment and form of this invention has been illustrated, it is obvious to those skilled in the art that modifications may be made without departing from the scope and spirit of the foregoing disclosure. Therefore, it is understood that the invention is limited only by the claims appended hereto.

We claim:

1. An electrical-to-fluidic interface device for rapidly switching a constant fluidic supply pressure between opposing output ports and comprising: a fluidic amplifier having first and second output ports and first and second control ports; a fluidic power source for providing a constant steady state supply pressure thereto; first and second poppet valves disposed within said amplifier control ports for simultaneously opening and closing respective ports and having a common stem externally coupled therebetween; electromagnetic means coupled to said common valve stem for alternately opening and closing said control ports, said electromagnetic means being a coil assembly supported on first and second iron cores and an elongated armature assembly disposed for limited, bidirectional rotation between said cores in response to electrical stimulation of said coil assembly; a first end of said elongated armature being coupled to said valve stem for simultaneously opening one control port while closing the other; and flexible, resilient stopping means disposed adjacent said electromagnetic means in the plane of rotation of said armature for terminating bidirectional rotation of the armature prior to impact of the armature with the coil assembly.

2. An electrical-to-fluidic interface device as set forth in claim 1 wherein said stopping means are first and second bumper stops having rubber pads disposed adjacent opposite sides of the other end of said elongated armature for stopping rotation of said armature, said first and second iron cores are U-shaped cores with the ends thereof facing each other, and said coil assembly is first, second, third and fourth coils, each of said coils being supported by an arm of said iron cores adjacent the ends thereof.

* * * * *